United States Patent Office 3,282,727
Patented Nov. 1, 1966

3,282,727
PRESSURE-SENSITIVE ADHESIVE TAPES WITH IMPROVED RELEASE COATINGS
John W. Crone, Jr., Hickory, and Charles O. Pike, Newton, N.C., assignors to Shuford Mills, Inc., Hickory, N.C., a corporation of North Carolina
No Drawing. Filed Oct. 30, 1962, Ser. No. 234,239
4 Claims. (Cl. 117—68.5)

This invention relates to improved release coatings for pressure-sensitive adhesive tapes and to methods for the preparation of new pressure-sensitive adhesive tapes having excellent unwinding characteristics and other desirable properties.

Pressure-sensitive adhesive tape is, for the most part, made and used in the form of rolls having individual layers of tape spirally wound in layers. When such tape is used, it is necessary to unwind a length of tape from contact with the back of the layer of tape below it in the roll. It would be highly desirable for most forms of pressure-sensitive adhesive tapes to possess just sufficient adhesion to the back of the tape so that the tape could be reformed into a self-contained roll and remain in this form until ready for use at which time it would unroll with a very minimum of tension. However, this optimum situation cannot be obtained reducing the cohesive and tacky properties of the pressure-sensitive adhesive without detriment to this prime characteristic of the tape. Control of the critical balance between release characteristics upon unwinding of a tape from the roll and the maintenance of adhesive characteristics of the pressure-sensitive layer is of great concern to the pressure-sensitive tape industry.

The release or unwind characteristics of pressure-sensitive adhesive tapes is of such importance to the manufacturers of such tapes that The Pressure Sensitive Tape Council, an association of adhesive tape manufacturers, in its "Test Methods for Pressure Sensitive Tapes" employs two separate test methods which relate to this aspect of adhesive tapes. Thus, the glossary of terms used in the pressure-sensitive tape industry, as contained in said publication as revised May of 1959, defines "adhesion to backing" as the force required to remove tape from its own backing to which it has been reapplied with a definite pressure after removal from the roll, this property being tested in accordance with PSTC Test No. 1. Similarly, "unwind adhesion" is defined as the force required to remove the tape from the roll under prescribed conditions determined using PSTC Test No. 3. These properties which reflect the unwinding release characteristics of the tape may be contrasted to the "shear adhesion" which is defined as the force required to pull the adhesive tape from a standard flat surface in a direction parallel to the surface to which it has been affixed by a definite pressure. This latter property is commonly measured in terms of the time required to pull a standard area of tape from a test panel under a standard load, e.g., PSTC Test No. 2.

A wide variety of different classes of material have been tested and tried in commercial production as "release agents" for pressure-sensitive adhesive tapes. The term "release agent" has come to mean, in the pressure-sensitive adhesive tape industry, some material which is used in a small amount in a coating composition applied to the back of the tape, the so-called "release coating," for the purpose of reducing the unwind adhesion.

Although there are some discussions in technical publications concerning release agents and release coating compositions for adhesive tapes, most of the printed disclosures on this subject are found in issued patents. The early work in the pressure-sensitive adhesive tape field refers to back-size compositions or materials and gave little or no attention to the problem of unwind adhesion. As the manufacture of PSA tapes became more sophisticated and the use of PSA tapes expanded with consequent increase in demands of tape users for improved properties, the unwind adhesion characteristics of tapes became recognized as an important factor. Thus, in the early development of pressure-sensitive adhesive tapes, a major use was in masking for painting operations and the backing coat for the tape was considered primarily from the viewpoint of its solvent-resistance since this was important in preventing solvent in a paint from detrimentally affecting pressure-sensitive adhesive layer on the opposite side of the backing. U.S. 2,281,445 is representative of this type of prior art which concerned the solvent-resistance characteristics of a backing coating for the adhesive tapes. While such coatings may have affected the adhesion to the backing and unwind adhesion as referred to above, this type of prior art publication gave little or no attention to this aspect. One of the early U.S. patents which specifically discusses the application to an adhesive tape of a layer of material repellent to the pressure-sensitive adhesive for the purpose of reducing unwind adhesion in the tape is U.S. 2,358,531. Numerous patents have issued subsequently which specifically relate to release coatings and release agents, including U.S. 2,607,711, that concerns higher-alkylacrylates and methacrylates as release agents, U.S. 2,880,862 which concerns the use of stearamide, ethylene distearamide and methylol stearamide as release agents and 2,822,290 which discloses use of higher alkyl amine salts or amides of polybasic inorganic acids for this purpose. These patents are representative of the development of the art of release coatings for adhesive tapes which, for the most part, employs some form of long-chain alkyl compound as the active release agent.

There is no particular problem in finding a variety of materials which can be applied to the back of an adhesive tape in order to reduce unwind adhesion of the tape. It is quite another matter, however, to provide a release composition which will substantially reduce unwind adhesion without detrimentally effecting shear adhesion or other necessary characteristics of the tape, e.g., flexibility, tear resistance, tensile strength, and solvent resistance. Furthermore, it has been found that many release agents which appear attractive when a freshly prepared roll of adhesive tape is tested are found to be completely unusable because the pressure-sensitive properties of the tape are destroyed, or some other property is adversely affected, when the tape is stored in roll form for several months or longer. A useable and satisfactory release agent must produce stable release properties, i.e., maintain substantially constant adhesion to backing and unwind adhesion characteristics in the tape over the normal shelf life.

The problem of stability with release coatings for adhesive tapes has been alleviated in the past by the use of a double coating technique. Thus, while even the best of the commercially available release agents exhibit some loss in stability of the release properties, it has been found that this stability decrease can be mitigated by double coating the back with a primer coat followed by the release coat. This, obviously, is an undesirable expedient because each additional coat which is employed in the formation of a tape substantially adds to the ultimate cost of the adhesive tapes.

A major use for pressure-sensitive adhesive tapes is the protection of highly polished surfaces against marring, scratching or other disfigurations during normal handling or treatment of the article, e.g., embossing, sand-blasting, etching or the like. Highly polished sheets of plastic material and metals are frequently protected in this fashion with pressure-sensitive adhesive sheets. Products made specifically for this purpose have become known in the trade as "protective tapes." Examples of this type of tape are disclosed in U.S. 2,156,279 and 2,393,668.

The use of release coatings in PSA tapes presents a special problem where the tape is to be employed for protective purposes on highly polished surfaces, especially with reflective metal surfaces. Thus, the release agent may transfer in minute amounts to the adhesive layer and this will form film-like haze on highly polished metal surface when the protective tape is removed from contact with the metal. The appearance of the soap-like haze on the highly polished surface is known in the trade as "ghosting." Regardless of the technical explanation for the phenomena, ghosting is an annoyance to users of protective tapes because it necessitates use of additional labor in order to try to eliminate the haze. Actually, in some cases where protective tape is employed to produce embossed metal by punching or pressing a metal sheet with the protective tape in place between the embossing platen and the sheet, the figuring of the metal may make it impossible to satisfactorily remove the haze from the embossed metal sheet after the protective tape has been lifted from the fabricated metal.

A principal object of this invention is the provision of pressure-sensitive adhesive tapes having improved unwind adhesion characteristics coupled with good shear adhesion, good strength and other desirable tape properties comparable to such properties possessed by available competitive tapes.

Further objects include:

(1) The provision of adhesive protective tapes which are substantially free of tendency to deposit a ghosting haze upon highly polished metal surfaces when the adhesive tape is brought in contact and then removed from the surface.

(2) The provision of new forms of release coatings for pressure-sensitive adhesive tapes.

(3) The provision of methods for forming pressure-sensitive adhesive tapes which have the ability to be unwound from rolls in which the tape is wound upon itself with relatively low unwind tension.

(4) The provision of PSA tapes having good stability of low unwind tension over extended periods of time and varying temperature conditions.

(5) The provision of new methods of forming adhesive tapes with release coatings that do not require a double coating operation in order to form a tape having satisfactory stability of release properties.

(6) The provision of release coatings for pressure-sensitive adhesive tapes having paper backings which coatings improve the tear resistance of the final tape in addition to providing good unwind adhesion characteristics.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by a new process for the production of pressure-sensitive adhesive tapes which comprises, in combination, the steps of providing a backing web for adhesive tape, coating the backing web with a release coating composition comprising a resin binder material and between about 0.5 and 10% of an arylene diamine diamide of a fatty acid as hereinafter defined, drying and curing the applied release coating upon the tape backing at an elevated temperature and further coating the surface of the tape backing opposite to the applied release coating with a pressure-sensitive adhesive.

Advantageously, the arylene diamides to be used as release agents in accordance with this invention are those having the following formula:

RCONH—Ar—NHCOR wherein:

R is an alkyl radical containing 16 to 18 carbon atoms, and

Ar is a monocyclic arylene radical.

It has been further found advantageous to dry and cure the release coating upon the tape backing at a temperature between 130°–200° C.

The preferred material for use as a release agent is p-phenylene distearamide which is most advantageously used in an amount between 2 and 6% by weight based upon the total weight of the release coating composition.

Advantageously, particularly useful release coatings for use in accordance with the present invention can be prepared from the following combination of ingredients in approximately the weight percentages as indicated:

| | Percent |
|---|---|
| Amine-aldehyde resin | 10–15 |
| Oil-modified alkyd resin | 30–40 |
| Film-forming vinyl polymer | 15–20 |
| Inorganic filler | 20–40 |
| Release agent as defined | 0.5–10 |

By proceeding in accordance with the process as described above, one obtains new and improved pressure-sensitive adhesive tapes which are characterized by their ability to be unwound from a roll in which the tape is wound upon itself with relatively low unwind tension, good stability of such low unwind tension over extended periods of time and varying temperature conditions, and relatively no tendency to deposit a film-like haze upon highly polished surfaces with which the tape is contacted and then removed. Such tape comprises a unified paper backing, a pressure-sensitive adhesive coating firmly affixed upon one surface of the paper backing and a release coating on the surface of the backing opposite to said adhesive coating, which release coating comprises a resin binder material and between about 0.5 to 10% by weight, based upon the weight of the total release coating, of an arylene diamine diamide as hereinbefore defined.

A more complete understanding of the new products and processes of this application may be had by reference to the following examples of actual operations in accordance with the invention. In these examples and throughout the remainder of the specification and claims, all parts and percentages are by weight unless otherwise specified.

EXAMPLES

Example 1

A release coating composition was prepared from the following ingredients:

| | Wet, percent | Dry, percent |
|---|---|---|
| Thermosetting melamine-formaldehyde resin (60% solution in aromatic solvent) | 14 | 10.7 |
| Short-oil alkyd resin (60% solution in aromatic solvent) | 46.8 | 36.3 |
| Vinyl chloride (90%)—vinyl acetate (10%) polymer | 14 | 18.2 |
| Toluene (part a) | 22 | |
| Methyl ethyl ketone | 22 | |
| p-Phenylene diamine distearamide | 3.7 | 4.8 |
| Toluene (part b) | 19 | |
| Titanium dioxide filler | 30.8 | 30.0 |

In the foregoing listing, the figures under the column headed "wet," are the parts by weight of the individual ingredients while the figures in the column headed "dry" give the weight percentages of the non-volatile solids in the release coating composition.

The coating composition was prepared by mixing together the toluene (part a) and methyl ethyl ketone in a mixing vessel equipped with a side entering propeller type agitator and then adding the vinyl polymer and mixing until a clear solution was obtained. Then, the thermosetting resin and alkyd resin solutions were added streamwise with continuous agitation and the mixture was raised slowly to a temperature of 50° C.

Into a separate smaller mixing vessel equipment with an agitator, the toluene (part b) was charged, heat was applied to raise the temperature to about 50° C. and the distearamide was added and agitation continued until a clear solution was obtained. The resulting solution was then transferred in streamwise fashion to the heated solution of resins in the larger container with continuous mixing to form a homogeneous viscous fluid. Finally, with the viscous mass under constant agitation and at the elevated temperature, the titanium dioxide filler was added in small increments and blended in. The addition was spread over a mixing period of about one hour to obtain a final uniform cream-colored viscous mass.

A white paper of saturation grade and 28 pound basis weight which had been unified by impregnation with about 90%, based upon the total weight of the unified paper, of a saturant composed of a butadiene-acrylonitrile elastomeric polymer was coated on one side with the resulting release coating composition. The coating was accomplished using a paper speed of about 60 feet per minute using a doctor blade coater adjusted to give a deposit of about 0.5 ounce per square yard of paper (dry basis weight) of release coating. From the blade coater, the continuous web of paper passed into a gas fired hot air oven having a front end temperature of about 85° C. and an outlet end temperature of about 200° C. The length of the oven relative to the speed and length of travel of the paper therein was such that the paper required approximately 1.5 minutes to pass through the oven. The oven was operated under force draft to remove quickly all solids evaporated from the solution coated paper.

In a separate operation, a pressure-sensitive adhesive composition was prepared from the following ingredients:

| | |
|---|---|
| Natural rubber (No. 1 smoke sheet) | 31.3 |
| GRS 1022 (butadiene-styrene copolymer) synthetic rubber | 31.3 |
| Titanium dioxide pigment | 1 |
| Aluminum hydrate powder | 24 |
| Zinc oxide powder | 8 |
| Beta-pinene resin | 3.1 |
| Polyhydroxy phenol anti-oxidant | 1.1 |
| Zinc dibutyl dithiocarbamate | 0.3 |
| Thermosetting phenolic resin | 2.5 |
| Mineral white oil | 9.4 |
| Toluene | 322 |

This adhesive mass was prepared by masticating together on rubber rolls the natural rubber, synthetic rubber, pinene resin, the anti-oxidant, the dithiocarbamate and the three inorganic powders using a standard roll mixing procedure until a uniform rubbery mass was obtained. This mass was then sheeted from the mixing rolls, cut into small chips and slowly added into a mixing vessel equipped with a side entering propeller-type agitator which had been filled with the toluene. The addition was accomplished in about two hours and the mixer was allowed to stir for another half hour, after which the phenolic resin was added and the mixture was again stirred at room temperature for about five hours. Next the mineral white oil was added streamwise to the mass and permitted to stir for another hour. An amber colored viscous solution was obtained.

The resulting liquid adhesive composition was applied to the release coated paper using a doctor blade coater with the blade gap adjusted to deposit a layer of the solution which upon evaporation of the solvent would leave about 1.2 ounces per square yard of adhesive mass. The inlet end of the drying oven was heated to a temperature of about 70° C. and the outlet end of the oven to a temperature about 130° C. The time for passage of the adhesive coated backing through the oven was about 1.5 minutes. As the resulting adhesive protective tape emerged from the drying oven, it was rolled into jumbo rolls. These were subsequently moved to a slitting and package station where the production with the tape was slit into widths between 1 and 18", the tape being rolled upon cores and cut to suitable length between 10 and 100 ft.

Samples of the resulting tape were taken at suitable intervals as the jumbo rolls were being formed and these samples were subjected to tests according to established PSA tape testing methods to determine adhesion to backing, unwind adhesion, wet-aged adhesion to backing, and wet-aged unwind adhesion, tensile strength, stretch, tear strength, and shear adhesion. The results of these tests are reported in Table I under the heading "Tape 1."

Three inch widths of the tape were applied with a ten pound roller to the highly polished surface of a chrome steel plate. The samples of tape were then pulled from the plate and a visual comparison of the areas previously covered by the tape was made with adjacent areas of the metal plate which had not come in contact with the adhesive tape. No difference in appearance between the tape-contacted and other areas of the metal plate could be detected.

*Example II*

The procedure of Example I was repeated with the exception that the para-phenylene diamine distearamide of the release coating was replaced with an equal amount of ethylene distearamide. The results of the tests performed on the resulting pressure-sensitive adhesive tape are reported in the following Table I under the column headed "Tape 2."

This tape was also subjected to the metal panel appearance test as explained in Example I. Upon removal of the tape of Example II from the panel, the areas of contact of the tape could be readily detected and were distinguished by a soap film-like haze which reduced the light reflective qualities of the polished metal surface in comparison with the adjacent areas of the plate which had not come in contact with the tape.

TABLE I

| | Tape 1 | Tape 2 |
|---|---|---|
| Normal Adhesion...........oz.. | 19 | 21 |
| Wet-aged adhesion...........oz.. | 13 | 6 |
| Adhesion to backing...........oz.. | 11 | 14 |
| Wet-aged adhesion to backing...........oz.. | 9 | 4 |
| Unwind adhesion...........lb.. | 0.15 | 0.35 |
| Wet unwind adhesion...........lb.. | 0.2 | 0.45 |
| Shear adhesion...........p.s.i.. | 47 | 45 |
| Stretch............ | 5 | 5 |
| Tensile strength............ | 15 | 18 |
| Finch tear strength............ | 19 | 13 |
| Gage...........mils.. | 5.6 | 5.7 |

In the foregoing table, normal adhesion was determined by PSTC Test No. 1, wet-aged normal adhesive was conducted in the same way on test samples mounted upon panels which had been stored at 100% relative humidity and 40° C. for 24 hours, normal adhesion to backing was determined using PSTA Test No. 1 which had been applied according to the test to its own backing rather than a metal test panel, wet-aged adhesion to the backing was conducted using this test on samples given the 100% R.H. and 40° C. treatment, unwind adhesion was determined by PSTC Test No. 3, wet unwind adhesion by samples given the 100% R.H. and 40° C. treatment, tensile strength was measured by PSTC Test No. 4, stretch by PSTC Test No. 6, shear adhesion was determined using the procedure of PSTC Test No. 2 with the modification of determining the force required to slide the test strip from the steel panel by a tensile tester rather than in terms of the time for a 500 gram load to strip the sample, the tear strength was determined by ASTM Test D827–47 and gage by PSTC Test No. 5.

*Example III*

A release coating was applied to a 30 lb. kraft paper which had been unified by 90% saturation with a butadiene-acrylonitrile elastomeric polymer from an aqueous latex using the release coating composition and procedure as described in Example I. The resulting release coated paper tape backing was then coated on the opposite side to the release coating with a pressure-sensitive adhesive using the following adhesive liquid composition:

Synthetic rubber polymer
    (75% butadiene–20% styrene) _____ 50
Natural rubber _____ 50
Dehydrogenated rosin _____ 90
Calcium silicate _____ 90
Zinc oxide _____ 50
Mineral oil _____ 30
Rubber anti-oxidant _____ 2
Toluene _____ 600

The adhesive composition was applied to produce a pressure-sensitive adhesive layer amounting to about 3 ounces per square yard of tape and the tape was dried in an oven at a maximum temperature of about 120° C. until the volatile solvents in the adhesive layer had been evaporated.

As the paper emerged from the drying oven, it was rolled into jumbo rolls which were then transferred to a slitting and packaging station where small dispenser rolls of tape one-half to 2 inches wide and containing 100 to 500 inches of tape were slit from the jumbo rolls and rolled onto packaging cores. Representative sample rolls of the resulting tape were removed as the slitting operation progressed and were subjected to established test procedures for evaluating the adhesion to backing and unwind adhesion characteristics of the rolls. It was found that the tape had about a 20% average improvement in unwind adhesion properties as compared with commercially available competitive tape of the same general classification as the tape of this sample. Furthermore, it was found that this improved release characteristic of the tape remained substantially constant when the tape rolls were stored for at least six months at temperatures varying between about 0° and 40° C.

The arylene diamides as hereinbefore defined have been found to be a class of materials that give unique results when used as release agents in pressure-sensitive adhesive tapes. Of this group of materials, p-phenylene diamine distearamide is preferred since it provides a high degree of the unique advantages of the new release agents in the tapes, namely, improved unwind adhesion qualities, stability of such unwind characteristics upon aging, improvement in tear resistance with paper backed tapes and relative freedom from "ghosting" in application of tape taken from a roll of the tape to highly polished metal surfaces. Other compounds of the class contemplated for use as release agents in accordance with the invention include N,N'-distearoyl-1,3-diaminobenzene; p-phenylene diamine dipalmitamide; the diamide of p-phenylene diamine and tall oil; N,N'-distearoyl-3,5-diamino toluene; p-phenylene diamine dimyristamide; N,N'-distearoyl-2,5-diamino keryl benzene and comparable compounds and mixtures of such substances.

The new release agents are effective in relatively very small amounts in the release coating compositions, i.e., 0.5 to 10% by weight of the total release coating. The amount may advantageously be varied to accommodate the nature of the pressure-sensitive, the quantity of adhesive used in the tape and the unwind adhesion characteristics which may be demanded by a user of any given tape. A concentration of between about 2 and 6% by weight, based upon the total weight of a release coating applied to the adhesive tape, has been found particularly useful.

The release agent must be incorporated in the tape as a component of a film forming resin binder matrix or coating. Such a coating material should be adherent to the tape backing, unreactive to the pressure-sensitive adhesive, not detrimental to the backing web and substantially indefinitely resistant to deterioration or change. Moreover, the efficiency of the release agent appears to be improved if it exhibits incipient crystallization in the resin binder matrix to create a surface orientation of the agent molecules. A wide variety of resinous film forming materials are available and a formulation including the new release agent can be easily made by those skilled in the art, in view of the information provided herein, to meet particular needs of any special form or variety of tape.

It has been found that coating compositions containing a substantial amount of alkyd resin are particularly useful in forming the new release coatings. It appears that there may be a certain amount of chemical reaction between the release agent and the alkyd resin to form a final coating in which the release agent is firmly retained so that there is virtually no transfer of the release agent to the pressure-sensitive adhesive layer even when the tape is stored in roll form over extended periods of time. Oil modified alkyd resins made from the phthalic anhydride or comparable polycarboxylic acid anhydrides with polyols and fatty acids to have a slight excess of hydroxyl groups have been found particularly useful. Other film forming resins may advantageously be included with the alkyd resins in the release coating composition. This includes the amino-aldehyde resins, e.g., melamine-formaldehyde resins, alkylated urea-formaldehyde resins and the like; vinyl polymers, e.g., polyvinylchloride, vinyl chloride-vinyl acetate copolymers, vinylidene chloride polymers and the like; acrylic polymers, e.g., polymers of alkyl esters of acrylic and methacrylic acids, and comparable film forming agents known to be useful in preparing flexible, strong coating films.

The release coating is advantageously applied as a solution of the solid coating ingredients in a volatile solvent. Aromatic solvents, such as toluene or benzene, alone or in combination with other volatile solvents such as methyl ethyl ketone, alkyl esters, alkanols or the like may be employed. The quantity of solvent used will control the viscosity of the final coating composition which in turn is controlled by the resins used as the binder matrix. Normally the liquid coating composition will comprise 10 to 90% solids, the remainder being volatile solvents. The solids in the coating composition, in addition to the release agent and binder resins, may comprise fillers or pigments to give additional body to the release coat or color. Pigments can also be used to make the backing so it may be printed upon by printing inks, i.e., so-called "printable tape." Titanium oxide, zinc oxide, aluminum silicate, calcium sulfate, chrome oxide, carbon black and other comparable fillers and pigments may advantageously be used in amounts between about 1 to 50% by weight of the total solids in the release compositions.

The release coating is applied advantageously in as small amount as required to produce necessary release properties unless the coating is also to serve a multiple purpose such as coloring the back of the tape, providing a printable back or the like. Typically, the release coating may be applied at the rate of about 0.1 to 3 ounces per square yard of tape. It may be applied in any suitable fashion such as by spraying, hot melt coating, blade coating, roller coating or the like, at ambient or elevated temperatures. Following the application of the coat, the tape and the applied release coat should be heated to evaporate any solvents that may be present and to cure the coat to a solvent-resistant film. For this purpose, curing temperatures of between about 130° and 200° C. are advantageously used and the drying and curing operation at such temperatures generally involves a period of about 1 to 30 minutes.

The release coating compositions, in addition to the film forming resins, fillers and release agent, may include small amounts, e.g., 1–10% by weight, of additional materials known in the art to be useful in preparation of backing coats for adhesive tapes including oxidation inhibitors, flow-control agents, dyes, light-filtering agents and the like.

Any backing material known to be useful in the preparation of pressure-sensitive adhesive tapes may be employed in conjunction with the new release coatings. This includes non-fibrous films such as vinyl plastics, cellophane, cellulose esters, polyethylene terephthalate or similar polyesters and comparable non-fibrous films. Also useable are woven fabrics such as cotton fabric, synthetic fiber fabrics, glass fabrics and the like, and non-woven fibrous webs such as self-bonded polyester fiber webs, synthetic fiber felts or the like. However, the invention is particularly useful in connection with tapes made from paper which has been treated with a saturant to unify the fibers and impart internal strength and resistance to delamination. Diolefin polymers are particularly useful as saturants for unifying the paper, but any of the known procedures and compositions developed for this purpose may be employed to prepare paper for use as a backing for the new tapes. Examples of saturating agents for unifying paper are found in U.S. Patents 2,236,527, 2,410,078 and 2,592,550. Advantageously, paper which has been unified in accordance with the disclosure in copending application of John W. Crone, Jr., filed October 8, 1962, and entitled "Pressure-Sensitive Adhesive Tapes and Methods of Their Preparation" may be employed.

The pressure-sensitive adhesive is an essential component of the new adhesive tapes. Numerous forms of such adhesives are known and may be used in forming these tapes. Such adhesives generally comprise an elastomeric polymer base to which is added tackifying resins and fillers. The foregoing examples disclose recipes for pressure-sensitive adhesives which may be employed in forming the new adhesive tapes. Additional examples of useable pressure-sensitive adhesive compositions are found in numerous U.S. patents, e.g., U.S. 2,142,039, 2,156,380, 2,498,338 and 2,750,314.

The adhesive is applied in sufficient amount to create a tacky surface upon the tape backing. For preferred adhesives, this is between about 1 and 5 ounces per square yard of backing.

As illustrated by the foregoing examples, satisfactory adhesive tapes may be prepared in accordance with this invention by directly applying the pressure-sensitive adhesive to the tape backing. However, it may be advantageous to first apply a bonding or primer coat to the backing sheet before the adhesive layer is coated on to the backing. Many types of bonding or primer compositions are known to the art, and a selection of one which is best suited for anchoring either the adhesive mass or the release layer to the backing sheet may be readily accomplished by those skilled in the art. Usually, the primer is composed of the same general ingredients as the adhesive mass, but in proportions necessary to give a more tacky mass. The primer also is applied more sparingly than the adhesive mass. For example, the primer is advantageously applied in an amount between about 0.1 and 0.3 ounce per square yard. Examples of useable primers are found in U.S. Patents 2,177,627, 2,236,567, 2,424,996 and 2,897,960.

New adhesive tapes using the release coatings of this invention may be employed generally for most purposes for which pressure-sensitive adhesive tapes are known to be useful. Because the new release coatings eliminate the "ghosting" effect in application of tapes to highly polished metal surfaces, the invention is particularly useful in the production of protective tapes and especially paper backed protective tapes which can be made at relatively low cost to meet the demands of large volume users.

The subject matter to be protected by United States Letters Patent in view of the foregoing specification is defined in the following claims.

We claim:
1. A pressure-sensitive adhesive tape characterized by:
 (a) ability to be unwound from a roll in which the tape is wound upon itself with relatively low unwind tension,
 (b) good stability of such low unwind tension over extended periods of time and varying temperature conditions, and
 (c) freedom from tendency to deposit a film-like haze upon a highly polished metal surface with which the tape is brought in contact,
said tape comprising:
 (A) a unified paper backing,
 (B) a pressure-sensitive adhesive coating firmly affixed upon one surface of said paper backing, and
 (C) a release coating on the surface of said paper backing opposite to said adhesive coating, said release coating consisting essentially of a resin binder material and between about 0.5 to 10% by weight, based upon the weight of the total release coating, of p-phenylene diamine distearamide.

2. A pressure-sensitive adhesive tape as claimed in claim 1 wherein said release coating has the following composition as expressed in percentages by weight:

| | Percent |
|---|---|
| (a) melamine-formaldehyde resin | 10–15 |
| (b) oil-modified alkyd resin | 30–40 |
| (c) vinyl chloride polymer | 15–20 |
| (d) inorganic filler | 20–40 |
| (e) p-phenylene diamine distearamide | 0.5–10 |

3. A pressure-sensitive adhesive tape characterized by ability to be easily unwound from a roll, good stability of such low unwind tension upon aging and freedom from deposit of haze to highly polished metal surfaces when the tape is applied to the metal surface and then removed therefrom comprising a backing web, a pressure-sensitive adhesive coating upon one surface of said web and a release coating on the opposite surface of said web, said release coating consisting essentially of a resin binder material and between about 0.5–10% by weight, based upon the weight of the release coating, of a diamide of the formula:

$$RCONH-Ar-NHCOR$$

wherein:
R is an alkyl radical containing 16–18 carbon atoms, and
Ar is a monocyclic arylene radical.

4. A pressure-sensitive adhesive tape particularly useful in protection of highly polished metal surfaces during handling and working thereof which comprises a backing, a pressure sensitive adhesive coated upon one surface of said backing, and on the surface of the backing opposite to said adhesive a release coating consisting essentially of a resin binder material and between about 2 and 6% by weight, based upon the total weight of the release coating, of p-phenylene diamine distearamide.

References Cited by the Examiner

UNITED STATES PATENTS

| 2,532,011 | 11/1950 | Dahlquist et al. | 117—68.5 X |
| 2,822,290 | 2/1958 | Webber | 117—68.5 |
| 2,889,862 | 4/1959 | Sermattei | 260—21 X |
| 2,913,355 | 11/1959 | Collins | 117—68.5 |
| 2,914,167 | 11/1959 | Holte | 117—68.5 |
| 2,995,467 | 8/1961 | Webber et al. | 117—68.5 X |
| 3,111,449 | 11/1963 | Gold et al. | 117—68.5 X |

WILLIAM D. MARTIN, *Primary Examiner.*

W. D. HERRICK, *Assistant Examiner.*